United States Patent

[11] 3,567,852

[72] Inventor Allen H. Ett
Bethesda, Md.
[21] Appl. No. 764,136
[22] Filed Oct. 1, 1968
[45] Patented Mar. 2, 1971
[73] Assignee International Business Machines Corporation
Armonk, N.Y.

[54] FILM DISPLAY SYSTEM
6 Claims, 7 Drawing Figs.

[52] U.S. Cl. .......... 178/6.8, 178/7.2, 178/7.85, 250/217
[51] Int. Cl. .......... H04n 5/36, H04n 7/18
[50] Field of Search .......... 178/6.8, 7.2, 7.2 (D), 7.6, 7.85; 250/217 (CRT)

[56] References Cited
UNITED STATES PATENTS

| | | | |
|---|---|---|---|
| 3,297,822 | 1/1967 | Braid | 178/7.85 |
| 3,331,920 | 7/1967 | Larson | 178/7.85 |
| 3,340,359 | 9/1967 | Fredkin | 178/6.8 |
| 3,359,563 | 12/1967 | Stetten | 178/7.85 |

*Primary Examiner*—Robert L. Griffin
*Assistant Examiner*—Joseph A. Orsino, Jr.
*Attorneys*—Hanifin and Jancin and Maurice H. Klitzman

ABSTRACT: An information retrieval system for reading and displaying information contained on a photographic film, in which the combination of the reading and displaying functions is accomplished by using multiplexing techniques. A single light path transmits light in two directions to achieve perfect registration between the information read from the film and the information displayed from the film.

INVENTOR
ALLEN H. ETT

BY Maurice H. Klitzman
ATTORNEY

FILM DISPLAY SYSTEM

BACKGROUND OF THE INVENTION

This invention relates to information retrieval systems and more particularly to information retrieval systems for reading and displaying information contained on a photographic film.

In the prior art, systems for reading and displaying information contained on photographic film required either two separate stations, one for reading and a second for displaying; or a single station wherein the reading and displaying was accomplished by using two light paths between the film and the detection means. The disadvantage of the prior art systems is that there is no registration between the information displayed and the information read from a frame of film. Registration between the information read and the information displayed from the film is necessary so that discrete points of information can be addressed repeatably, with correlation between the displayed data and the read data.

Prior art attempts at solving the registration problem involved manual adjustments of the optical system. This adjustment has proven unsatisfactory when a high degree of precision is required in the registration of the information read with the information displayed from the film.

OBJECTS

It is, therefore, the principal object of the present invention to accurately and precisely register information read from a photographic film with information displayed from said photographic film.

A further object of the present invention is to automatically register the information presented by the two images.

Another object of the present invention is to simplify the optics required to achieve both reading and displaying of information from a film.

SUMMARY OF THE INVENTION

Accordingly, this invention provides an improved information retrieval system for reading and displaying information contained on a photographic film in which a single light path is used on a multiplex basis for both reading and displaying said information to achieve precise and accurate registration between the information read and the information displayed from the film.

There are many multiplexing techniques which may be used with the present invention to accomplish its objects. Among these are time division, light polarity division, and color division multiplexing.

The present invention resides in the apparatus for registering two images produced from a transparent document. A first illuminating means is positioned so that it illuminates a film frame with the light as modulated by the film passing along a light path being focused by a lens system on a reflective surface. The reflective surface also contains a second illuminating means wherein small points of light may be positioned with a high degree of accuracy and precision. The light reflected from the reflecting means is focused on the image mask of a light storage means. This light storage means provides the image for visual display of the information contained on the transparent document.

The light produced by the second illuminating means is viewed by the light storage means as well as being focused by said lens system on the information bearing document. A photosensitive detection means is placed in a position so that it senses and is responsive to the sequence of points on said document illuminated by said second illuminating means. The electrical signals produced from said photosensitive detection means provides the read image.

Perfect registration is achieved between the displayed image and the read image due to the common reference for all image points on the face of the reflecting means. That is, every point on the document is identified with a specific location point on the reflecting means so that light traveling in either direction along the common light path has a common registration reference.

In the embodiment disclosed a time division multiplexing system is employed wherein the system operates cyclically, each cycle being divided into a plurality of time intervals. In the first time interval, the information bearing film is illuminated by a pulse of light from a strobe lamp, said light being modulated by the information contained on the film and focused on a reflecting surface such as the face of a cathode-ray tube. The face of the cathode-ray tube is viewed by an image storage means such as a vidicon or image orthicon tube which acts as a temporary storage of the information to be displayed. During the second time interval of each cycle, the strobe lamp is turned off and the face of the CRT is illuminated in a preprogrammed point-by-point manner where the light from said CRT face is focused on the frame of film so that the light emanating on the other side of the film can be received by a photosensitive detection means for reading the information contained on the film. The CRT in combination with the lens system, the film and the photosensitive detection means is a point-by-point film reading system.

The registration achieved between the information displayed and the information read results from the use of the single light path between the film and the CRT face. That is, a point on the film frame which is illuminated during the first time interval of each cycle causes an image to be formed at a precise geometric location on the face of the CRT and during the second time interval of each cycle when that precise point on the face of the CRT is illuminated it causes the same initial object point on the film to be sensed. This results in a direct positional correlation between all points on the film frame to be read and displayed and all points illuminated on the face of the CRT.

For the purposes of the instant invention, any device which includes a flat reflective surface and a precise point-by-point light source, such as, a one-way mirror combined with either a matrix of light cells or a laser with appropriate deflection circuitry may be used in place of the cathode ray tube.

The foregoing and other objects, features and advantages of the invention will be apparent from the following more particular description of preferred embodiments of the invention, as illustrated in the accompanying drawings.

DESCRIPTION

Figure 1:
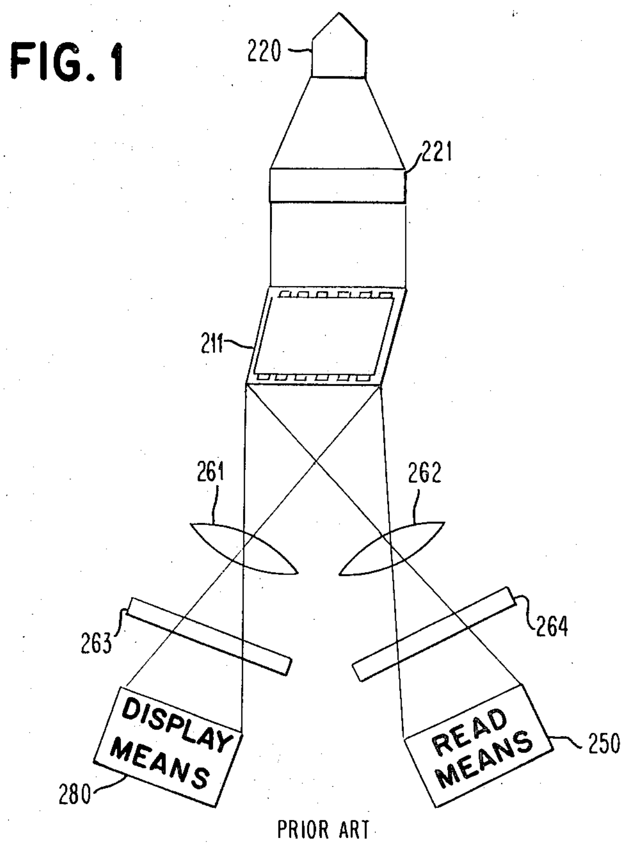
FIG. 1 shows a prior art information retrieval system in which separate light paths are used to accomplish the reading and displaying of information from a photographic film.

Referring now to FIG. 1, the problems and disadvantages inherent in the prior art information retrieval systems are readily apparent. Light from a light source 220 is focused by lens 221 on film frame 211 which is then viewed separately by the display means through lens 261 and filter 263 and the read means 250 through lens 262 and filter 264 each at an oblique angle to the plane of the film frame 211. There is no way that the information read by read means 250 can be registered with the information displayed by display means 280. At best, only an approximate optical alignment can be achieved.

Figure 2:
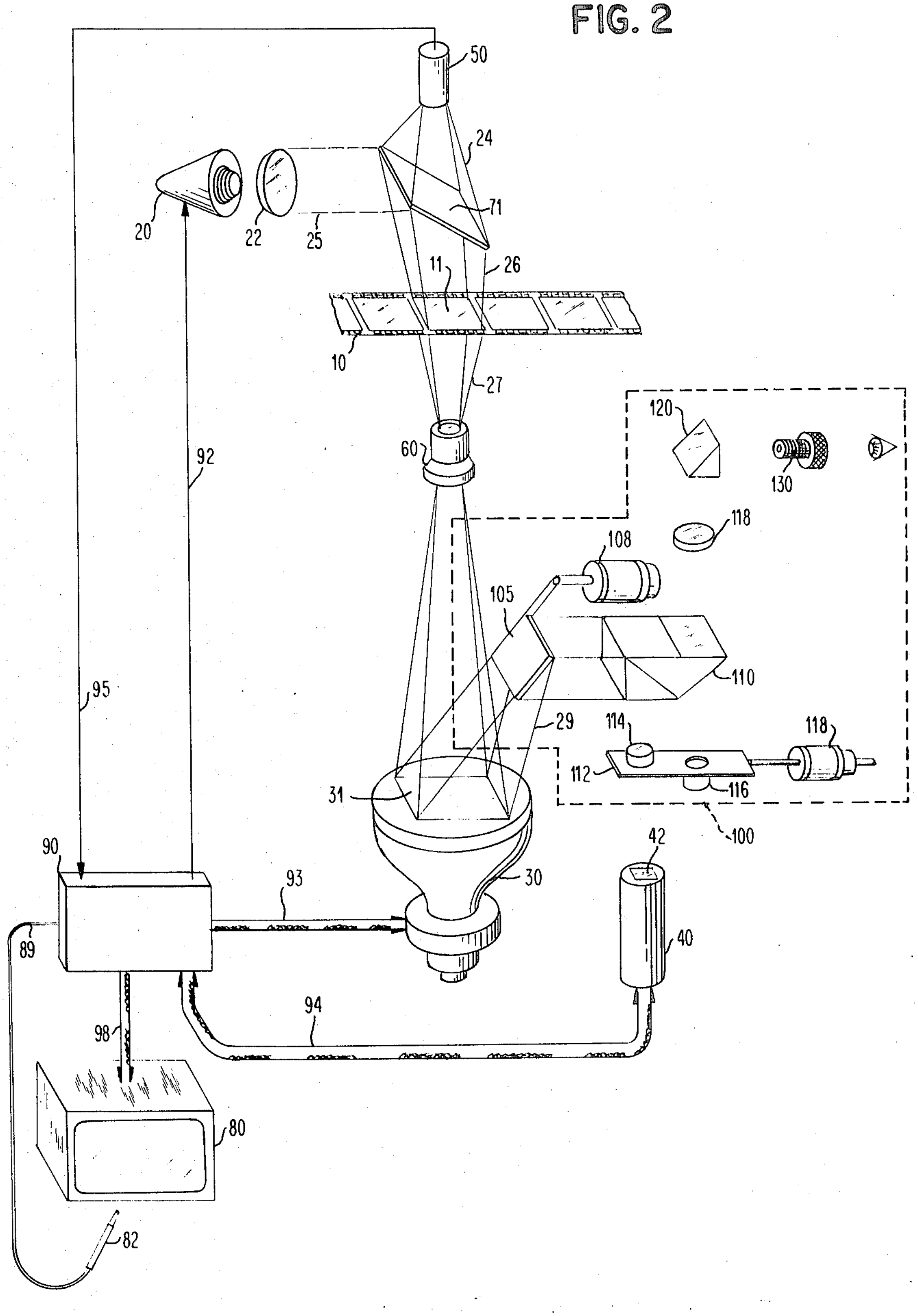
FIG. 2 is an isometric view of an apparatus embodying the principle of the invention.

An apparatus embodying the present invention as shown in FIG. 2, overcomes the registration problem inherent in the prior art system by the use of a single light path to achieve both the reading and displaying functions.

The apparatus embodying the invention using the time division multiplex techniques will be described in detail as the preferred embodiment.

A first illuminating means is provided for illuminating the information bearing film during the first time interval of each read/display cycle. The first illuminating means consists of strobe lamp 20 which is connected to control unit 90 by line 92. Control unit 90 supplies a signal to strobe lamp 20 which causes said strobe lamp 20 to emit a flash of light. Said flash of light is focused by lens 22, travels along light path 25 to the surface of half-silvered mirror 71, which is mounted at an angle so that the light impinging from said strobe lamp 20 is reflected through film frame 11 of film strip 10 mounted at an oblique angle therewith. The light thus passing through the film frame 11 is modulated by the information contained thereon. This light then travels along light path 27 to a focusing means.

A focusing means, embodied by lens system 60, focuses the modulated light from said film frame 11 on the reflective surface 31 of a reflective light source. The modulated light passes from lens system 60 along light path 28 to reflective surface 31.

A reflective light source embodied as a cathode-ray tube 30 provides means for imaging the information contained on the film frame 11 as well as means for sequentially illuminating precisely located points on said reflective surface 31 for the purpose of sequentially reading the information contained on said film frame 11. Cathode-ray tube 30 receives all operating potentials and control signals from control unit 90 along connecting line 93.

A prism 105 mounted above the reflective surface 31 and out of light path 28 directs the reflected image which travels along light path 29 to beam splitter 110. Prism 105 is movably mounted and attached to linear actuator 108 so that said prism 105 may be moved to change the viewed area on reflective surface 31.

Beam splitter 110 which is mounted in line with prism 105 directs the modulated light impinging on its input face in two directions.

For manually viewing the image on the face 31 of cathode-ray tube 30, beam splitter 110 directs the light through lens 118 to prism 120, both of which are mounted along the axis of one of the beam splitter output surfaces. Prism 120 directs the modulated light to eye piece 130 which is mounted in a position along the output axis of prism 120.

The second output surface of beam splitter 110 directs the modulated light along an axis which is the center line of a light storage means 40. Along this axis, lens holder 112 is movably mounted to linear actuator 118. Linear actuator 118 controls which of two lenses are placed in the light path along said axis. Lens 114 and lens 116 are fixedly mounted on lens holder 112. Lens 114 being a 3:1 magnification lens for expanded viewing of a limited area of the image and lens 116 being a 6:1 magnification lens for viewing the entire image.

Light storage means for storing the image reflected from the face of said CRT, is embodied by a vidicon tube 40. The light image is stored on image mask 42 of vidicon 40 for a duration of approximately 33 milliseconds. Vidicon 40 is connected to control unit 90 by line 94 along which operating potentials and control signals are transmitted.

A visual display means 80 for displaying the information contained on said information bearing film is connected to control unit 90 by line 98. Control unit 90 receives the image data from light storage means 40 and transforms said date to proper form for transmittal to visual display means 80. A light pen 82 is connected to control unit 90 by line 89 for operator intervention and control of the data transmitted by control unit 90 to CRT 30.

A photosensitive detection means 50 is mounted along the axis formed by the center line of cathode-ray tube 30, focusing means 60, and half-silvered mirror 71, beyond half-silvered mirror 71 so that when points are illuminated on the face 31 of CRT 30, focused by focusing system 60 on the film frame 11 and transmitted to said photosensitive detection means by said half-silvered mirror 71, the light thus presented to the input of the photosensitive detection means will be sequentially transmitted along line 95 to control unit 90 so that the information contained on said film may be read.

Alternate embodiments, such as color division multiplexing and light polarity multiplexing, may also be used with the present invention.

In a color division multiplexing system which is not shown in the drawings, a first colored filter would be placed in light path 25 between lens 22 and half-silvered mirror 71 and a second colored filter would be placed in light path 24 between photosensitive detection means 50 and half-silvered mirror 71 wherein the first light source 20 could be a low intensity continuous duty lamp which would allow some degree of simplication and reduction in the size of control unit 90.

Likewise, if light polarity division multiplexing were to be used with the present invention, a first polarity filter would be placed in light path 25 and a second polarity filter would be placed in light path 24 to eliminate the interference between the first and second light source.

OPERATION

Figure 6:
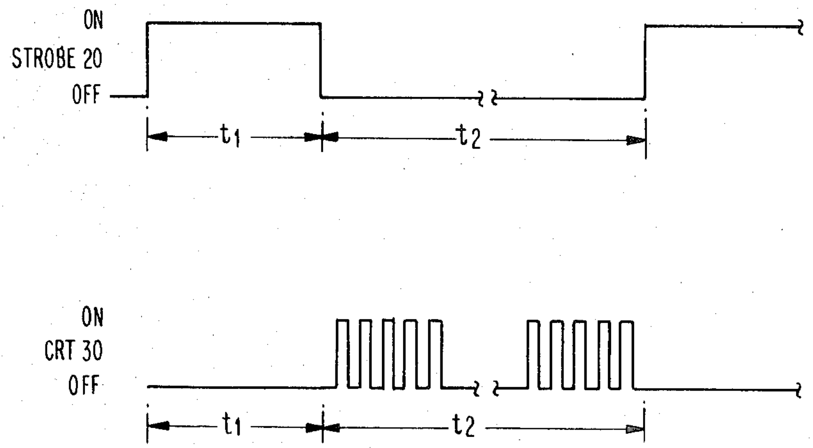
PRIOR ART FIG. 6
FIG. 6 is a timing chart showing the time intervals in the time division multiplex operation of the apparatus.

The apparatus of the preferred embodiment as shown in FIG. 2 of the invention as described, operates cyclically where each cycle is divided into a first time interval and a second time interval as shown in FIG. 6.

Figure 3:
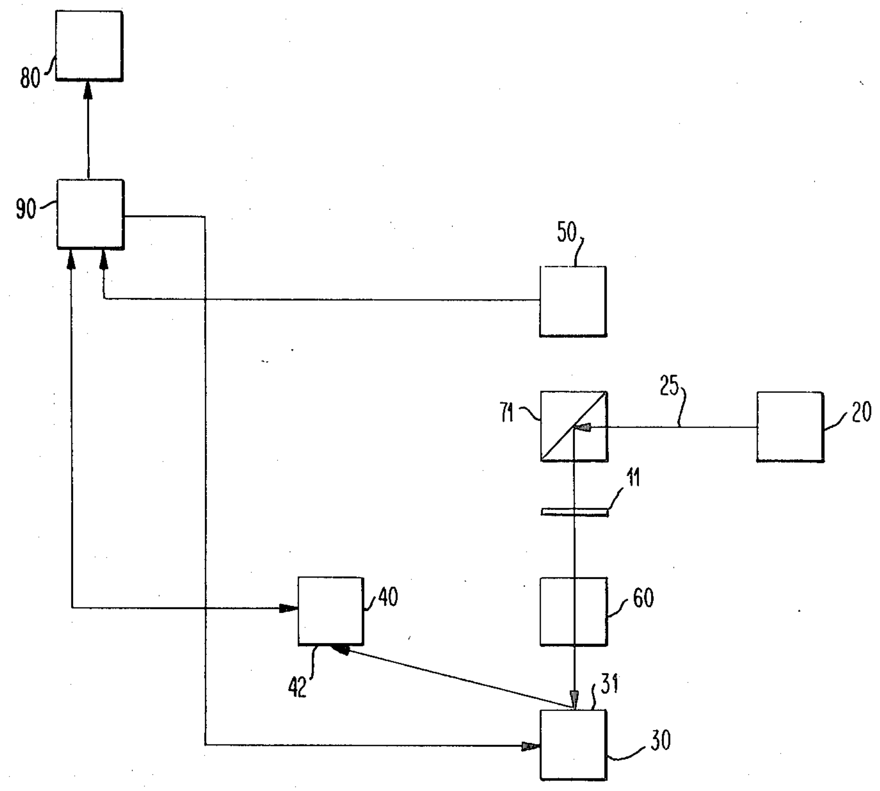
FIG. 3 is a block diagram showing the paths of light during the first time interval of each read/display cycle.

Referring now to FIG. 3, during the first time interval of each read/display cycle, information contained in a frame 11 of film is optically transmitted to the image mask 42 of vidicon 40. A flash of light from a first light source is reflected by a half-silvered mirror to the frame of film containing the information to be read and displayed. The modulated light is then focused by a focusing means, reflected from the face of a reflective light source to a light storage means. The operation of the apparatus during the first time interval of each read/display cycle will now be described more fully.

Referring again to FIG. 2, control unit 90 transmits an impulse signal along line 92 to strobe lamp 20 causing said strobe lamp to emit a flash of light. This flash of light is focused by lens 22 along light path 25 on the face of half-silvered mirror 71. Mirror 71 reflects the light along the light path 26 through frame 11 of film strip 10. The light passing through the film frame 11, is modulated by the information contained thereon. This modulated light then passes along light path 27 to lens system 60 which then focuses said modulated light on reflective face 31 of CRT 30, said light traveling along light path 28. The modulated light is reflected by reflective face 31 of CRT 30 along light path 29 to optical system 100, which is shown in detail in FIG. 7. Prism 105 directs the light to beam divider 110. One output of beam divider 110 is through one of selected lenses 114 and 116 depending upon the magnification desired. Lenses 114 and 116 focus the modulated light on the image mask 42 on vidicon 40. Operating potentials and control signals for vidicon 40 are transmitted from control unit 90 along path 94.

This completes the operation of the device during the first time interval of each read/display cycle. It is to be noted that during this first time interval, CRT 30 and photosensitive detection means 50 are inactive.

At the completion of the first time interval of the read/display cycle, control unit 90 turns off strobe lamp 20 and transmits to CRT 30 a series of signals along line 93. This series of signals causes points upon the face 31 of CRT 30 to be illuminated in a sequence under program control. The timing of the first and second time interval of each read/display cycle is shown most clearly in FIG. 6. As can be seen, during *t1*, the first time interval of each read/display cycle, strobe lamp 20 is turned on while CRT 30 is inactive and during the second time interval of each read/display cycle, $t2$, strobe 20 is off while CRT 30 has a plurality of points illuminated in seriatum.

Figure 4:
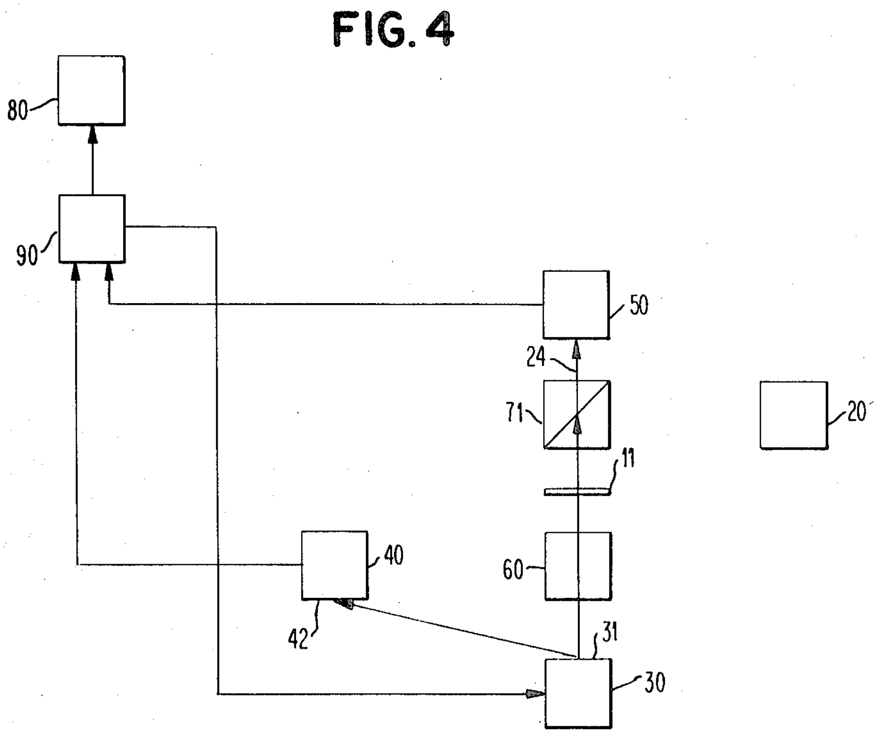
FIG. 4 is a block diagram showing the paths of light during the second time interval of each read/display cycle.

Referring now to FIG. 4, during the second time interval of each read/display cycle, information contained in frame 11 of film strip 10 is read into storage by photosensitive detection means 50 detecting a sequence of modulated light pulses emitted from the reflective light source 30. The sequence of light pulses emitted from the surface 31 of reflective light source 30 follows two paths. The first path which is the read path, is along the axis of focusing means 60 through the film frame to be read through the half-silvered mirror 71 to the photosensitive detection means 50. The second path of the light pulses from the reflective light source is to the light storage means for transmission to the visual display means for operator intervention and control.

The light emitted from the face 31 of CRT 30 is transmitted along light path 28 and focused by lens system 60 on film frame 11, the light traveling along light path 27. The light impinging upon the film frame 11 is modulated by the information contained thereon. This modulated light then travels along light path 26 through half-silvered mirror 71 to photosensitive detector 50. Photosensitive detector 50 transmits a series of electrical signals representative of the modulated light received along line 95 to control unit 90.

Control unit 90 provides all the operating potentials and control signals to CRT 30 to vidicon 40 and to photosensitive detector 50 during the second time interval during each read/display cycle.

The light emitted from face 31 of CRT 30 is also directed by optical system 100 to the image mask 42 of vidicon 40 during the second time interval of each read/display cycle. This results in an effective superposition of the preprogrammed image from the CRT 30 with the actual image presented to the vidicon 40 during the first time interval of each read/display cycle. This composite image is operated on by control unit 90 for transmission to visual display unit 80. Operating potentials and signals are transmitted to visual display 80 from control unit 90 by lines 98.

A light pen 82 connected to control unit 90 allows the operator to act upon the composite display to modify the information transmitted to CRT 30 from control unit 90.

Figure 7:
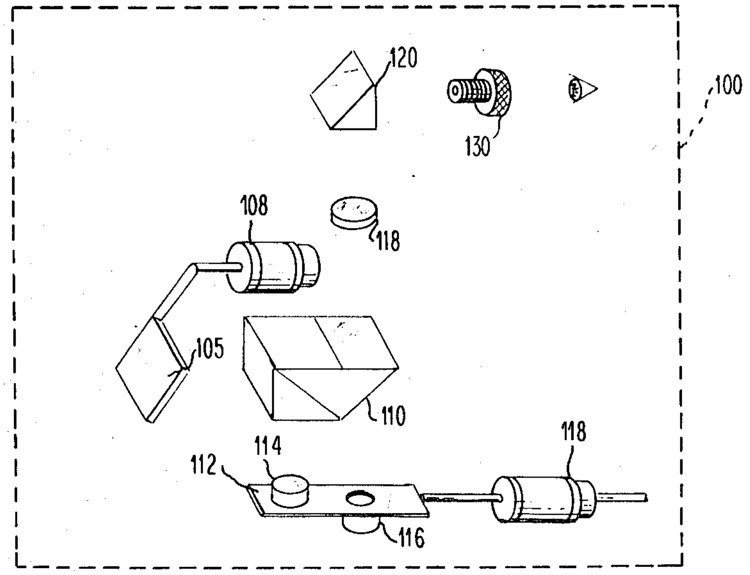
FIG. 7 is a detailed view of the optical apparatus for manually viewing the superimposed images presented on the light reflecting means.

Optical system 100 which is shown in detail in FIG. 7, performs several functions during the operation of this apparatus. The first, which has already been referred to, is that of directing the light emitted from the CRT face 31 to the image display vidicon 40. A second function of optical system 100 is to provide for manually viewing the information reflected from CRT face 31. The light emitted from CRT face 31 is directed by prism 105 through beam splitter 110. It is then focused by lens 118, redirected by prism 120 to eye piece 130 for operator viewing. A third function of optical system 100 is to provide for a close up or expanded view of a portion of the reflected image from CRT face 31.

Lenses 114 and 116 which are mounted on mounting 112 are movably positioned by linear actuator 118. Lens 114 provides a 4:1 magnification of the image displayed, while lens 116 provides a 1:1 magnification. Therefore, if it is desired to view closely and in great detail, a specific area on the face of the CRT, lens 114 would be the appropriate lens to use. However, if the overall image is desired, lens 116 would be more appropriate.

Figure 5:
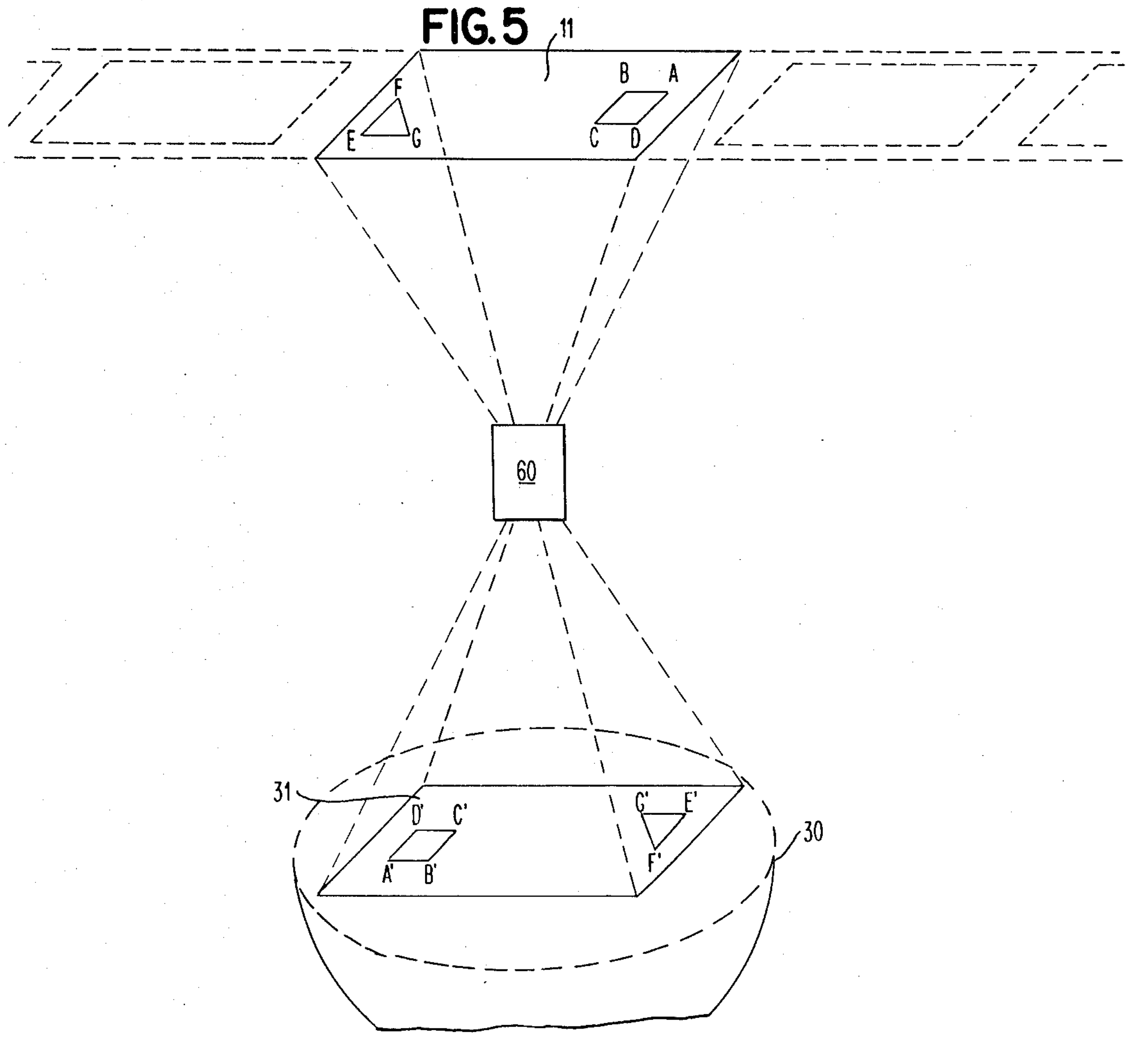
FIG. 5 shows a detailed example of the point-by-point precise registration between the information read and the information displayed from the film.

From the foregoing description and operation, and from FIG. 5, it can be seen that perfect registration is achieved between the information displayed from a frame of film and the information read from that frame of film. In FIG. 5, a representative frame 11 is under view, with points A, B, C, D, and E, F, G. When this frame is illuminated from above, as during the first time interval of each cycle, points A through G are focused by lens system 60 on face 31 of CRT 30 at points A′ through G′. And, conversely, when during the second time interval of each cycle, points A′ through G′ are illuminated by the electron beam of the CRT, lens system 60 focuses these points on the respective A to G points on the film frame. Thus, from this example, it can be seen that every point on the film frame is perfectly registered with a respective point on the face of the CRT thus insuring perfect correspondence and registration of the data read from the film with the data displayed from the film.

The only differences between the operation of the embodiment described and an embodiment wherein color division or light polarity division multiplexing is employed is that in the color division and light polarity division multiplexing systems the filters placed in light paths 24 and 25 allow the first light source and the reflective light source to be both operated at the same time so that a savings in time which is approximately equal to the duration of the first time interval of the time division multiplex system is achieved.

Referring now to FIG. 3 and FIG. 4 it can be seen that there is a common light path between the half-silvered mirror 71 to the reflective surface 31 to the light storage means 40. Therefore, it can be seen that if a single color light passing filter were placed in light path 24 between the half-silvered mirror 71 and the photosensitive detection means 50, separation of the images would be achieved.

While the invention has been particularly shown and described with reference to preferred embodiments thereof, it will be understood by those skilled in the art that various changes in form and details may be made therein without departing from the spirit and scope of the invention.

I claim:

1. An information retrieval system for identifying and storing information contained on a transparent document comprising:

a first light source for illuminating said transparent document;

a cathode-ray tube having a reflective surface and providing a point-by-point light source for illuminating said transparent document;

focusing means in the light path between said cathode-ray tube and said transparent document for transmitting and focusing light from said transparent document to said reflective surface of said cathode-ray tube and for transmitting and focusing light emitted by said cathode-ray tube to said transparent document;

light storage means for storing light reflected from said reflective surface of said cathode-ray tube and superimposed thereon the light pulses emitted by said cathode-ray tube so that the information to be displayed comprises a composite image;

visual display means for displaying the information contained in said light storage means;

a control unit for automatically adjusting the electrical signals transmitted to said cathode-ray tube to cause the light pulses emitted by said cathode-ray tube to coincide with the information contained on said transparent document;

comparison means contained within said control unit for comparing the information contained on said transparent document with stored information so that when the composite image formed by the information contained on said transparent document and light pulses emitted by said cathode-ray tube coincide the information contained on said transparent document is thereby identified;

photosensitive detection means for receiving light pulses emitted by said cathode-ray tube and modulated by the information contained on said transparent document and for transforming said modulated light pulses into electrical signals;

means for transmitting and storing said electrical signals so that the information contained on said transparent document may be retrieved for utilization at a later time; and said focusing means being in the path for transmitting said information from said transparent document to said reflective surface of said cathode-ray tube and for transmitting light pulses from said point-by-point light source of said cathode-ray tube to said transparent document to automatically establish registration between the information stored from said transparent document and the information displayed from said transparent document.

2. An information retrieval system according to claim 1 further comprising filter means for passing a single frequency of light between said transparent document and said photosensitive detection means.

3. An information retrieval system for identifying and storing data contained on a transparent document cyclically operable on a time division multiplex basis comprising;

a strobe lamp operable during a first time interval of each cycle for illuminating said transparent document;

a cathode-ray tube for reflecting light during said first time interval of each cycle and for emitting a series of light pulses during a second time interval of each cycle;

focusing means for focusing light emanating from said transparent document onto the reflective surface of said cathode-ray tube during said first time interval of each cycle and for focusing the light pulses emitted by said cathode-ray tube on said transparent document during said second time interval of each cycle;

means for identifying and displaying the information contained on said transparent document during said first interval;

photosensitive detection means, for receiving said light pulses emitted by said cathode-ray tube and modulated by the information contained on said transparent document during said second time interval of each cycle and for transforming said modulated light pulses into electrical signals;

storage means for storing said electrical signals generated by said photosensitive detection means during said second time interval of each cycle; and said focusing means being in the path for transmitting said information from said transparent document to said reflective surface of said device and for transmitting light pulses from said point-by-point light source of said device to said transparent document to automatically establish registration between the information stored from said transparent document and the information displayed from said transparent document.

4. An information retrieval system for identifying and storing information contained on a document, comprising:

first illumination means for illuminating said document;

second illumination means having a point-by-point light source and a reflective surface;

focus means for focusing light from said first illumination means, modulated by said document on said reflective surface and for focusing light from said point-by-point light source on said document;

light storage means for storing light reflected from said reflective surface and the light emitted by said point-by-point light source so that information to be displayed comprises a composite image;

means for identifying and displaying information contained on said document;

photosensitive detection means for receiving light pulses emitted by said point-by-point light source and modulated by information contained on said document and for converting said light pulses into electrical signals;

means for transmitting and storing said electrical signals; and said focusing means being in the path for transmitting said information from said document to said reflective surface and for transmitting light pulses from said point-by-point light source to said document to automatically establish registration between the information stored from said document and the information displayed from said document.

5. A method of registering information to be displayed from a document with information to be stored from said document, comprising the steps of:

illuminating said document with a first light source, the light from said light source being modulated by the information content of said document and imaged on a reflective surface;

illuminating said document point-by-point with a second light source which contains said reflective surface;

storing light reflected from said reflective surface and light emitted by said point-by-point illumination in a light storage means;

detecting the information produced by illuminating said document by said point-by-point illumination in a photosensitive detector; and comparing the information detected with information from said light storage means to register and identify the information on said document.

6. A method for registering information to be stored with information to be displayed from a transparent document comprising the steps of:

illuminating said transparent document by a continuous light source;

focusing light from said continuous light source modulated by information on said transparent document on a reflective surface of a second light source;

illuminating said transparent document point-by-point with said second light source such that the points illuminated by said point-by-point light source have exact registration with corresponding points on said transparent document illuminated by said continuous light source;

detecting information contained in modulated light generated by said second light source and passing through said transparent documents;

converting said modulated light to electrical signals;

storing said electrical signals in a storage device;

storing light reflected from and generated by said second light source in a light storage means;

converting light information in said light storage means to electrical signals;

comparing the information stored in said storage device with the information converted from said light storage means to register the information on said transparent document; and identifying and displaying superimposed images contained in said light storage means thus achieving registration of the image of said document formed by said continuous light source with the point-by-point light generated by said second light source.